United States Patent
Ho et al.

(10) Patent No.: US 9,507,663 B1
(45) Date of Patent: Nov. 29, 2016

(54) MEMORY DEVICE AND OPERATION METHOD

(71) Applicant: MACRONIX International Co., Ltd., Hsinchu (TW)

(72) Inventors: Hsin-Yi Ho, Hsinchu (TW);
Hsiang-Lan Lung, Hsinchu (TW);
Wei-Chih Chien, Hsinchu (TW);
Tu-Shun Chen, Hsinchu (TW);
Chia-Jung Chen, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 18 days.

(21) Appl. No.: 14/703,183

(22) Filed: May 4, 2015

(51) Int. Cl.
*G11C 29/00* (2006.01)
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0683* (2013.01)

(58) Field of Classification Search
CPC .......... G06F 11/1016; G06F 11/1068; G06F 11/1076; G06F 3/0619; G06F 3/064; G06F 3/0683
See application file for complete search history.

(56) References Cited

U.S. PATENT DOCUMENTS

| | | | |
|---|---|---|---|
| 6,046,939 A | 4/2000 | Noda et al. | |
| 7,945,825 B2* | 5/2011 | Cohen | G06F 11/1072 714/721 |
| 8,422,305 B2 | 4/2013 | Lee | |
| 9,384,088 B1* | 7/2016 | Jones | G06F 11/1016 |
| 2003/0142543 A1* | 7/2003 | Toyama | G06F 11/1064 365/185.09 |
| 2003/0231532 A1 | 12/2003 | Micheloni et al. | |
| 2006/0198202 A1* | 9/2006 | Erez | G11C 11/005 365/185.29 |
| 2006/0218471 A1* | 9/2006 | Arashi | G11B 20/10527 714/770 |
| 2008/0094893 A1* | 4/2008 | Choi | G06F 11/1072 365/185.03 |
| 2009/0113272 A1* | 4/2009 | Tan | G06F 11/1052 714/765 |
| 2014/0149827 A1 | 5/2014 | Kim et al. | |
| 2014/0372667 A1* | 12/2014 | Tan | G06F 12/0246 711/103 |

OTHER PUBLICATIONS

"Office Action of Taiwan Counterpart Application", issued on Aug. 9, 2016, p1-p5, in which the listed references were cited.

* cited by examiner

*Primary Examiner* — Guerrier Merant
(74) *Attorney, Agent, or Firm* — J.C. Patents

(57) ABSTRACT

A memory device and an operation method thereof are provided, and the operation method of the memory device includes following steps. A programming operation is performed to write an original data into a first memory array in the memory device. The original data in the first memory array is verified, and whether to generate a write signal is determined according to a verification result. An error correction code is generated according to the original data, and the error correction code and a write address are stored temporarily in a buffer circuit of the memory device. When the write signal is generated, the error correction code and the write address in the buffer circuit are written into a second memory array in the memory device.

20 Claims, 3 Drawing Sheets

MEMORY DEVICE AND OPERATION METHOD

BACKGROUND OF THE INVENTION

1. Field of the Invention

The invention relates to a memory device and an operation method thereof, and particularly relates to a memory device having an error correction code and an operation method thereof.

2. Description of Related Art

Recently, phase-change memories have become the prospective non-volatile memory technology due to the advantages of low voltage, low power consumption, and high integration in the manufacturing processes, etc. Generally speaking, to ensure the accuracy of data in the phase-change memories, the conventional memory devices commonly store a corresponding error correction code (ECC) for each data in the phase-change memories. Thus, in the conventional memory devices, each data in the phase-change memories has a corresponding error correction code, which results in a large amount of memory space being required to store the error correction codes. The development of miniaturization of the memory devices is consequently limited.

SUMMARY OF THE INVENTION

The invention provides a memory device and an operation method thereof According to the memory device and the operation method thereof, whether to write an error correction code corresponding to an original data into a second memory array is determined based on a verification result of the original data in the first memory array. In this way, memory space storing the error correction codes may be effectively reduced.

An operation method of a memory device according to the invention includes the following step. A programming operation is performed to write an original data into a first memory array in the memory device. The original data in the first memory array is verified and whether to generate a write signal is determined according to a verification result. An error correction code is generated according to the original data, and the error correction code and a write address are temporarily stored in a buffer circuit in the memory device. Also, when the write signal is generated, the error correction code and the write address in the buffer circuit are written into a second memory array in the memory device.

Besides, a memory device according to the invention includes a first memory array, a buffer circuit, and a second memory array. The memory device performs a programming operation to write an original data into the first memory array, and the memory device verifies the original data in the first memory array and determines whether to generate a write signal according to a verification result. In addition, the memory device generates an error correction code according to the original data, and temporarily stores the error correction code and a write address in a buffer circuit. Moreover, when the write signal is generated, the memory device writes the error correction code and the write address in the buffer circuit into the second memory array.

Furthermore, a memory device according to the invention includes a first memory array, and a second memory array. The memory device performs a first programming operation and a second programming operation to write a first original data and a second original data into the first memory array, and the memory device verifies the first original data and the second original data in the first memory array and determines whether to generate a first write signal and a second write signal according to verification results. The memory device generates a first error correction code and a second error correction code according to the first original data and the second original data. A number of bits of the first error correction code is different from a number of bits of the second error correction code. When the first write signal and the second write signal are generated, the memory device writes the first error correction code and the second error correction code into the second memory array.

Based on the above, in the invention, whether to write the error correction code corresponding to the original data into the second memory array is determined according to the verification result of the original data in the first memory array. In this way, the memory space for storing the error correction codes may be effectively reduced, and the development of miniaturization of the memory device may be facilitated.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
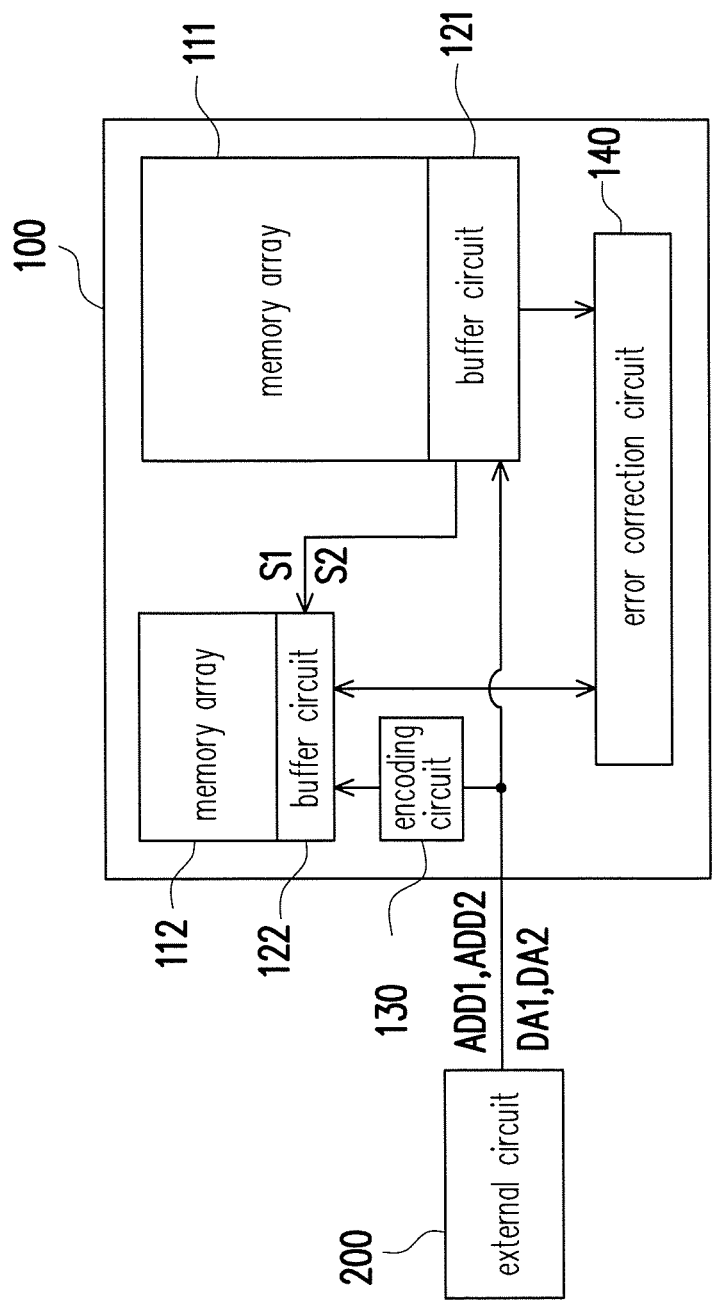
FIG. 1 is a schematic view illustrating a memory device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view illustrating a memory device according to an embodiment of the invention. Referring to FIG. 1, a memory device 100 includes memory arrays 111 and 112, buffer circuits 121 and 122, an encoding circuit 130, and an error correction circuit 140. In addition, the memory array 111 may store original data, and the memory array 112 may store error correction codes (ECC) corresponding to the original data. It should be noted that the memory device 100 determines whether to write the error correction codes corresponding to the original data into the memory array 112 according to a verification result of a programming operation of the original data. Accordingly, the memory device 100 does not require a large amount of memory space to store the error correction codes. In this way, a size of the memory array 112 for storing the error correction codes may be reduced, and the memory device 100 may thus be miniaturized.

Figure 2:
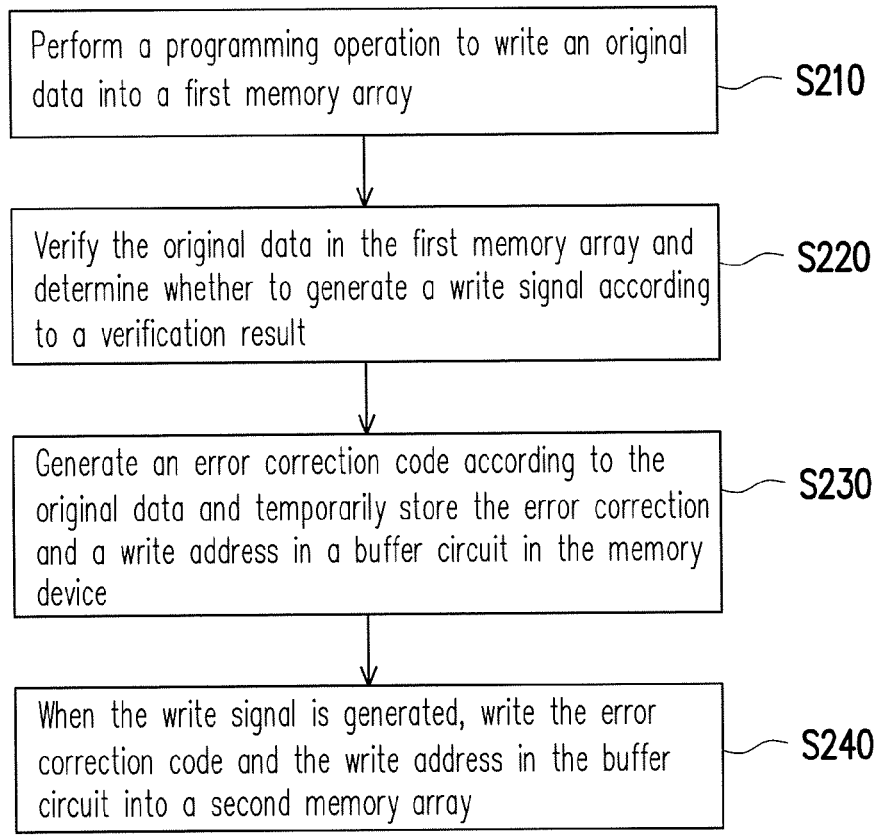
FIG. 2 is a flowchart illustrating an operation method of a memory device according to an embodiment of the invention.

FIG. 2 is a flowchart illustrating an operation method of a memory device according to an embodiment of the invention. In the following, operational details of the programming operation of the memory device 100 are described with reference to FIGS. 1 and 2. As shown in FIG. 1, an external circuit 200 (e.g., a central processing unit or other signal processing circuits) may select a memory block in the memory array 111 according to a write address ADD1, and stores an original data DA1 into the memory block.

Specifically, as shown in Step S210, the memory device 100 performs the programming operation to write the original data DA1 into the memory array 111 (i.e., a first memory array). In addition, the memory device 100 may temporarily store the original data DA1 in the buffer circuit 121, and then write the original data DA1 temporarily stored in the buffer circuit 121 into the memory array 111. Moreover, the memory array 111 may be a phase-change memory array, for example. Namely, in an embodiment, the memory array 111 includes a plurality of phase-change memory cells, and each of the phase-change memory cells includes a field-effect transistor (or other access devices, such as a diode or a bipolar junction transistor) and a phase-change memory element.

Figure 3:
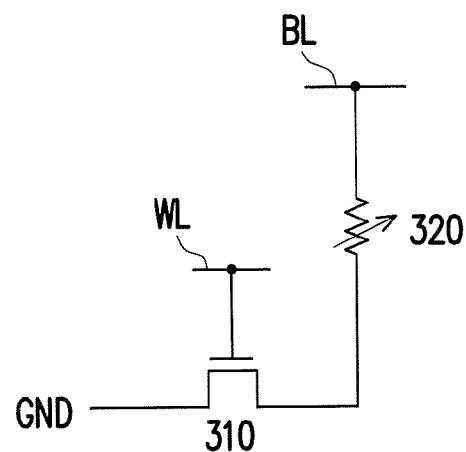
FIG. 3 is a schematic view illustrating a phase-change memory cell according to an embodiment of the invention.

For example, FIG. 3 is a schematic view illustrating a phase-change memory cell according to an embodiment of the invention. As shown in FIG. 3, the phase-change memory cell includes a field effect transistor 310 and a phase-change memory element 320. In addition, a first end of the phase-change memory element 320 is electrically connected to a bit line BL, a second end of the phase-change memory element 320 is electrically connected to a ground end GND, and a control end of the field effect transistor 310 is electrically connected to a word line WL. In addition, a storage state of the phase-change memory element 320 includes a low resistance state (e.g., logic 0), and a high resistance state (e.g., logic 1). In the programming operation, the memory device 100 may select the phase-change memory element 320 according to the write address ADD1, and may provide corresponding voltages to the bit line BL and the word line WL according to a data bit in the original data DA1. For example, when the data bit is logic 1, the memory device 100 may use a voltage on the word line WL to turn on the field effect transistor 310, and may provide a reset voltage to the phase-change memory element 320 through the bit line BL. In this way, the phase-change memory element 320 may be converted from the low resistance state to the high resistance state.

Furthermore, as shown in Step S220, the memory device 100 may verify the original data DA1 written into the memory array 111, and determine whether to generate a write signal S1 according to the verification result. Regarding details of Step S220, the memory device 110 may perform a verification operation to determine whether the programming operation of the original data DA1 fails. When the verification result indicates that the programming operation fails, the memory device 100 repeats the programming operation and the verification operation until the programming operation of the original data DA1 is successful. Besides, when the number of times of repeating the programming operation of the original data DA1 is greater than or equal to 1, the memory device 100 may generate the write signal S1. In other words, during the programming procedure of the original data DA1, if the programming operation of the original data DA1 has failed once, the memory device 100 generates the write signal S1.

Also, as shown in Step S230, the memory device 100 may generate the error correction code according to the original data DA1, and temporarily store the error correction code and the write address ADD1 in the buffer circuit 122. In addition, the memory device 100 may perform Step S230 at the same time when performing Step S210 or S220, or the memory device 100 may perform Step S230 before performing Step S210 or S220. Moreover, as shown in Step S240, when the write signal S1 is generated, the memory device 100 may write the error correction code and the write address ADD1 in the buffer circuit 122 into the memory array 112 (i.e., a second memory array).

In other words, the memory device 100 may temporarily store the error correction code and the write address ADD1 of the original data DA1 by using the buffer circuit 122. In addition, when the programming operation of the original data DA1 has failed once in the programming procedure, the memory device 100 may write the error correction code and the write address ADD1 corresponding to the original data DA1 into the memory array 112. Alternatively, when the condition that the programming operation of the original data DA1 fails does not occur, namely when the write signal S1 is not generated, the memory device 100 does not write the error correction code and the write address ADD1 corresponding to the original data DA1 into the memory array 112.

The memory device 100 may repeat Steps S210~S240, so as to write another original data into the memory array 111 and selectively write the corresponding error correction code of another original data into the memory array 112. Therefore, the memory device 100 may use the memory array 111 to store a plurality of original data and use the memory array 112 to store the corresponding error correction codes for some of the original data in the memory array 111. Besides, the numbers of bits of the error correction codes in the memory array 112 may be partially or completely different.

For example, the memory device 100 may repeat Step S210, so as to write an original data DA2 into the memory array 111 through another programming operation. Besides, the memory device 100 may repeat Step S220, so as to verify the original data DA2 written into the memory array 111 and determine whether to generate a write signal S2 according to a verification result. For example, the memory device 110 may perform another verification operation to determine whether the programming operation of the original data DA2 fails. When the programming operation of the original data DA2 fails, the memory device 100 repeats the programming operation and the verification operation of the original data DA2 until the programming operation of the original data DA2 is successful. Besides, when the number of times of repeating the programming operation of the original data DA2 is greater than or equal to 1, the memory device 100 may generate the write signal S2.

Furthermore, the memory device 100 may repeat Step S230, so as to generate an error correction code according to the original data DA2 and temporarily store the error correction code and a write address ADD2, which are corresponding to the original data DA2, in the buffer circuit 122. Besides, the memory device 100 may repeat Step S240, so as to write the error correction code and the write address ADD2, which are corresponding to the original data DA2, into the memory array 112 when the write signal S2 is generated. A number of bits of the error correction code corresponding to the original data DA2 may be different from a number of bits of the error correction code corresponding to the original data DA1.

It should be noted that, since the phase-change memory array is not subject to a read disturb effect, error bits in the phase-change memory array are mainly caused by the programming operation of the phase-change memory. Thus, the memory device 100 uses the verification result of the programming operation of each original data to determine whether to write the error correction code corresponding to the original data into the memory array 112. In this way, the memory device 100 needs not to store the corresponding error correction code for each original data. Namely, the memory device 100 only stores the corresponding error correction codes for some of the original data in the memory array 111. In this way, an accuracy of the original data may be ensured by using the error correction codes, and memory space for storing the error correction codes may be effectively reduced.

It should be noted that when the write signal S1 is generated, the error correction code and the write address ADD1 are written into the memory array 112 (i.e., the second memory array), and the write address ADD1 is set as a predetermined address corresponding to the error correction code. In other words, the memory array 112 may store a plurality of error correction codes and a plurality of predetermined addresses, and each of the error correction codes has a corresponding predetermined address. Namely, the memory device 100 has addressable error correction codes. Thus, when the external circuit 200 sends a read address, the memory device 100 may look up the predetermined addresses in the memory array 112 according to the read address. Also, when the corresponding predetermined address is found from the memory array 112, the memory device 100 may use the error correction code in the memory array 112 to correct a read data and output the corrected read data accordingly. Alternatively, when the corresponding predetermined address is not found, the memory device 100 may directly output the read data.

Figure 4:
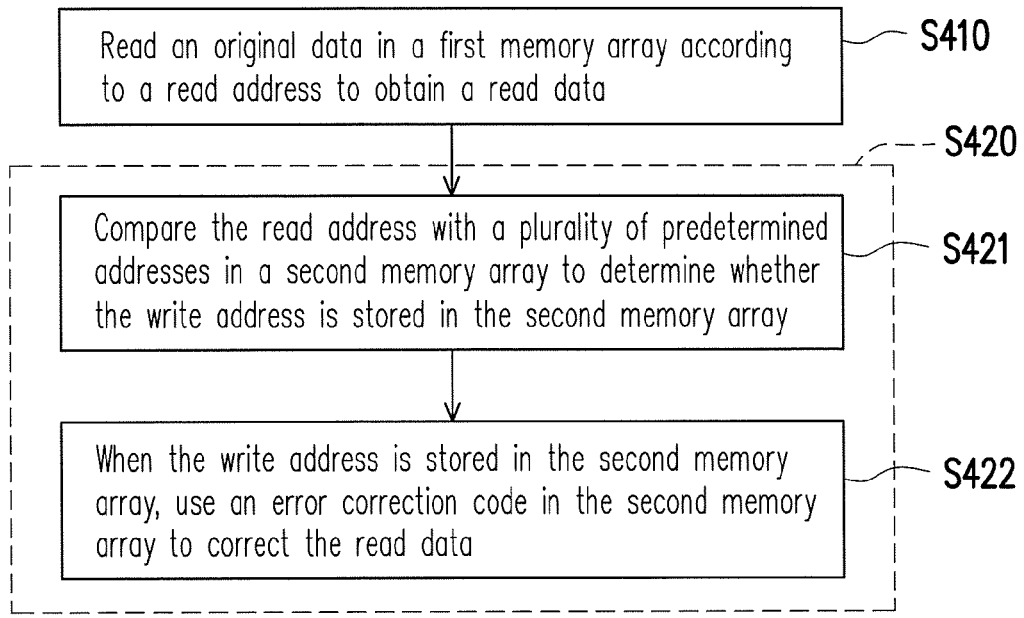
FIG. 4 is a flowchart illustrating an operation method of a memory device according to another embodiment of the invention.

For example, FIG. 4 is a flowchart illustrating an operation method of a memory device according to another embodiment of the invention. In the following, operational details of a read procedure of the memory device are described with reference to FIGS. 1 and 4. In the operation, the memory device 100 may receive a read address, and the read address may be the same as the write address ADD1. Thus, as shown in Step S410, the memory device 100 may read the original data DA1 stored in the memory array 111 according to the read address, so as to obtain a read data. Besides, as shown in Step S420, the memory device 100 may determine whether to correct the read data according to the read address.

For example, regarding details of Step S420, the memory device 100 may sequentially compare the read address with the predetermined addresses in the memory array 112 (i.e., the second memory array), as shown in Step S421, so as to determine whether the write address of the original data DA1 is stored in the memory array 112. Besides, when the read address is the same as one of the predetermined addresses, the write address of the original data DA1 is stored in the memory array 112. At this time, as shown in Step S422, the memory device 100 may read the error correction code of the original data DA1 from the memory array 112 and use the read error correction code to correct the read data. Alternatively, when the read address is different from the predetermined addresses, the error correction code of the original data DA1 is not written into the memory array 112. Thus, the memory device 100 under such condition may directly output the read data.

The memory device 100 may repeat Steps S410~S420. For example, the memory device 100 may repeat Step S410, so as to read the original data DA2 stored in the memory array 111 according to another read address and thus obtain another read data. Besides, the memory device 100 may repeat Step S420, so as to determine whether to correct the another read data according to the another read address.

It should be noted that the memory device 100 may store the error correction codes and complements of the error correction codes in two memory blocks in the memory array to ensure an accuracy of the data that is read from the memory array 112.

Figure 5:
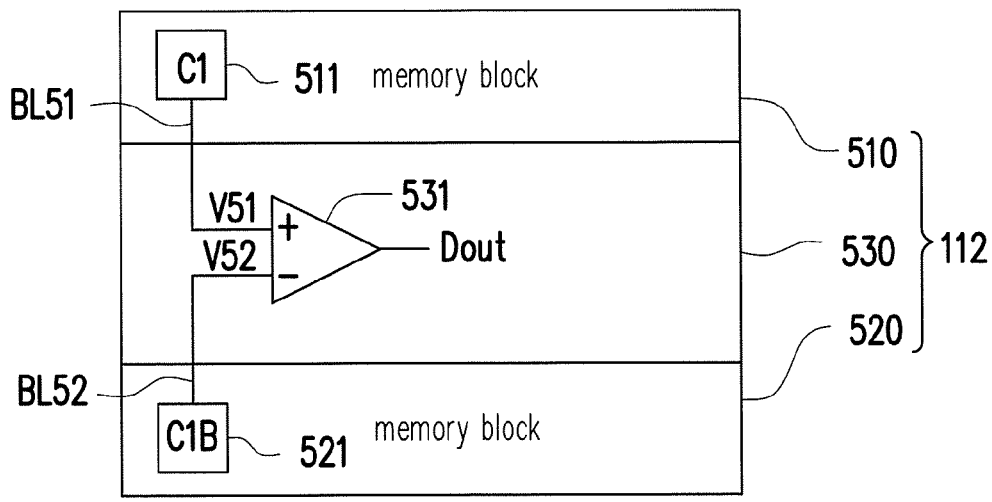
FIG. 5 is a schematic view illustrating a memory array according to an embodiment of the invention.

For example, FIG. 5 is a schematic view illustrating a memory array according to an embodiment of the invention. As shown in FIG. 5, the memory array 112 includes a memory block 510, a memory block 520, and a sensing circuit 530. The memory block 510 stores the error correction codes, and the memory block 520 stores the complements of the error correction codes. For example, in an embodiment, the error correction code includes a plurality of correction bits. Besides, taking a correction bit C1 in the correction bits as an example, the correction bit C1 is stored in a memory cell 511 in the memory block 510, and a complement C1B of the correction bit C1 is stored in a memory cell 521 in the memory block 520. Furthermore, the memory cell 511 is electrically connected to a bit line BL51, and the memory cell 521 is electrically connected to a bit line BL52.

The sensing circuit 530 includes a plurality of comparators, such as a comparator 531. In addition, the comparators may be respectively electrically connected to a plurality of bit lines in the memory block 510 and a plurality of bit lines in the memory block 520 through a column decoder (not shown). For example, when the memory device 100 reads a data in the memory cell 511, two input ends of the comparator 531 are respectively electrically connected to the bit lines BL51 and BL52 to receive a sensing voltage V51 from the bit line BL51 and a sensing voltage V52 from the bit line BL52.

In an embodiment, the memory array 112 may also be a phase-change memory array, for example. Thus, when the correction bit C1 stored in the memory cell 511 is logic 0 (e.g., the low resistance state), the sensing voltage V51 on the bit line BL51 correspondingly decreases. Besides, since the memory cell 521 stores the complement C1B of the correction bit C1, the sensing voltage V52 on the bit line BL52 correspondingly increases. Accordingly, the comparator 531 may generate an output signal with a low level in response to the sensing voltages V51 and V52. Namely, an output bit Dout generated by the comparator 531 is logic 0.

Alternatively, when the correction bit C1 stored in the memory cell 511 is logic 1 (e.g., the high resistance state), the sensing voltage V51 on the bit line BL51 correspondingly increases. Besides, since the memory cell 521 stores the complement C1B of the correction bit C1, the sensing voltage V52 on the bit line BL52 correspondingly decreases. Accordingly, the comparator 531 may generate an output signal with a high level in response to the sensing voltages V51 and V52. Namely, the output bit Dout generated by the comparator 531 is logic 1.

In other words, the sensing circuit does not compare the sensing voltage of the error correction code to a fixed reference voltage. Thus, the accuracy of the data that is read from the memory array 112 is ensured.

Moreover, with reference to the embodiment shown in FIG. 5, steps of correcting the read data by using the error correction codes in the second memory array include: electrically connecting a first memory block (e.g., the memory block 510) for storing the error correction codes through a plurality of first bit lines (e.g., the bit line BL51 is one of the first bit lines), and electrically connecting a second memory block (e.g., the memory block 520) for storing the complements of the error correction codes through a plurality of second bit lines (e.g., the bit line BL52 is one of the second bit lines); generating a plurality of output bits (e.g., the output bit Dout is one of the output bits) according to a plurality of first sensing voltages (e.g., the sensing voltage V51 is one of the first sensing voltages) from the first bit lines and a plurality of second sensing voltages (e.g., the sensing voltage V52 is one of the second sensing voltages) from the second bit lines; and correcting the read data by using the output bits.

In view of the foregoing, in the invention, the programming operation is used to write the original data into the memory array, and the buffer circuit is used to temporarily store the error correction code and the write address corresponding to the original data. In addition, when the condition that the programming operation of the original data fails occurs, the error correction code and the write address corresponding to the original data are written into another memory array. In this way, the memory device does not need to store the corresponding error correction code for each original data. Thus, the memory space for storing the error correction codes may be effectively reduced, and the development of miniaturization of the memory device may be facilitated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An operation method of a memory device, comprising:
    performing a programming operation to write an original data into a first memory array in the memory device;
    verifying the original data in the first memory array and determining whether to generate a write signal according to a verification result;
    generating an error correction code according to the original data, and temporarily storing the error correction code and a write address in a buffer circuit in the memory device; and
    when the write signal is generated, writing the error correction code and the write address in the buffer circuit into a second memory array in the memory device.

2. The operation method of the memory device as claimed in claim 1, wherein the step of verifying the original data in the first memory array and determining whether to generate the write signal according to the verification result comprises:
    performing a verification operation to determine whether the programming operation fails;
    when the programming operation fails, repeating the programming operation and the verification operation until the programming operation is successful; and
    when the number of times of repeating the programming operation is greater than or equal to 1, generating the write signal.

3. The operation method of the memory device as claimed in claim 1, wherein when the write signal is not generated, the error correction code and the write address in the buffer circuit are not written into the second memory array.

4. The operation method of the memory device as claimed in claim 1, further comprising:
    reading the original data in the first memory array according to a read address to obtain a read data; and
    determining whether to correct the read data according to the read address.

5. The operation method of the memory device as claimed in claim 4, wherein when the write signal is generated, the write address is stored in the second memory array as one of a plurality of predetermined addresses, and the step of determining whether to correct the read data according to the read address comprises:
    comparing the read address with the predetermined addresses to determine whether the write address is stored in the second memory array; and
    when the write address is stored in the second memory array, correcting the read data by using the error correction code in the second memory array.

6. The operation method of the memory device as claimed in claim 5, wherein a first memory block in the second memory array stores the error correction code, a second memory block in the second memory array stores a complement of the error correction code, and the step of correcting the read data by using the error correction code in the second memory array comprises:
    electrically connecting the first memory block through a plurality of first bit lines, and electrically connecting the second memory block through a plurality of second bit lines;
    generating a plurality of output bits according to a plurality of first sensing voltages from the first bit lines and a plurality of second sensing voltages from the second bit lines;
    correcting the read data by using the output bits.

7. The operation method of the memory device as claimed in claim 1, wherein the first memory array and the second memory array are respectively phase-change memory arrays.

8. A memory device, comprising:
    a first memory array, wherein the memory device performs a programming operation to write an original data into the first memory array, and the memory device verifies the original data in the first memory array and determines whether to generate a write signal according to a verification result;
    a buffer circuit, wherein the memory device generates an error correction code according to the original data, and temporarily stores the error correction code and a write address in the buffer circuit; and
    a second memory array, wherein when the write signal is generated, the memory device writes the error correction code and the write address in the buffer circuit into the second memory array.

9. The memory device as claimed in claim 8, wherein the memory device performs a verification operation to determine whether the programming operation fails, when the programming operation fails, the memory device repeats the programming operation and the verification operation until the programming operation is successful, and when the number of repeating the programming operation is greater than or equal to 1, the memory device generates the write signal.

10. The memory device as claimed in claim 8, wherein when the write signal is not generated, the memory device does not write the error correction code and the write address in the buffer circuit into the second memory array.

11. The memory device as claimed in claim 8, wherein the memory device reads the original data in the first memory array according to a read address to obtain a read data, and the memory device determines whether to correct the read data according to the read address.

12. The memory device as claimed in claim 11, wherein a first memory block in the second memory array stores the error correction code, a second memory block in the second memory array stores a complement of the error correction code, and the memory device further comprises:
   a sensing circuit, electrically connected to the first memory block through a plurality of first bit lines, and electrically connected to the second memory block through a plurality of second bit lines, wherein the sensing circuit generates a plurality of output bits according to a plurality of first sensing voltages from the first bit lines and a plurality of second sensing voltages from the second bit lines, and the memory device corrects the read data by using the output bits.

13. The memory device as claimed in claim 8, wherein the first memory array and the second memory array are respectively phase-change memory arrays.

14. A memory device, comprising:
   a first memory array, wherein the memory device performs a first programming operation and a second programming operation to write a first original data and a second original data into the first memory array, and the memory device verifies the first original data and the second original data in the first memory array and determines whether to generate a first write signal and a second write signal according to verification results; and
   a second memory array, wherein the memory device generates a first error correction code and a second error correction code according to the first original data and the second original data, a number of bits of the first error correction code is different from a number of bits of the second error correction code, and when the first write signal and the second write signal are generated, the memory device writes the first error correction code and the second error correction code into the second memory array.

15. The memory device as claimed in claim 14, wherein the memory device further comprises a buffer circuit, the memory device temporarily stores the first error correction code, a first write address, the second error correction code and a second write address in the buffer circuit, and when the first write signal and the second write signal are generated, the memory device writes the first error correction code, the first write address, the second error correction code and the second write address in the buffer circuit into the second memory array.

16. The memory device as claimed in 15, wherein the memory device performs a first verification operation to determine whether the first programming operation fails, when the first programming operation fails, the memory device repeats the first programming operation and the first verification operation until the first programming operation is successful, when the number of repeating the first programming operation is greater than or equal to 1, the memory device generates the first write signal, and when the first write signal is not generated, the memory device does not write the first error correction code and the first write address in the buffer circuit into the second memory array.

17. The memory device as claimed in 16, wherein the memory device performs a second verification operation to determine whether the second programming operation fails, when the second programming operation fails, the memory device repeats the second programming operation and the second verification operation until the second programming operation is successful, when the number of repeating the second programming operation is greater than or equal to 1, the memory device generates the second write signal, and when the second write signal is not generated, the memory device does not write the second error correction code and the second write address in the buffer circuit into the second memory array.

18. The memory device as claimed in 14, wherein the memory device reads the first original data in the first memory array according to a first read address to obtain a first read data, and the memory device determines whether to correct the first read data according to the first read address.

19. The memory device as claimed in 18, wherein the memory device reads the second original data in the first memory array according to a second read address to obtain a second read data, and the memory device determines whether to correct the second read data according to the second read address.

20. The memory device as claimed in 14, wherein the first memory array and the second memory array are respectively phase-change memory arrays.

\* \* \* \* \*